United States Patent [19]

Docimo

[11] Patent Number: 4,459,429
[45] Date of Patent: Jul. 10, 1984

[54] CABLE BOX

[75] Inventor: Peter J. Docimo, Alta Loma, Calif.

[73] Assignee: Marvin Electric Manufacturing Co., Los Angeles, Calif.

[21] Appl. No.: 393,594

[22] Filed: Jun. 30, 1982

Related U.S. Application Data

[63] Continuation of Ser. No. 164,173, Jun. 30, 1980, abandoned.

[51] Int. Cl.³ .............................................. H02G 3/08
[52] U.S. Cl. .................................. 174/65 R; 285/128
[58] Field of Search ............ 174/65 R; 285/128, 129; 339/103 R, 103 B, 103 C, 105, 107

[56] References Cited

U.S. PATENT DOCUMENTS 2,814,510 11/1957 Clark .................................. 285/129
2,938,741 5/1960 Lowery .............................. 285/128
3,783,176 1/1974 Lund et al. ....................... 174/65 R

FOREIGN PATENT DOCUMENTS 956710 10/1974 Canada ............................ 174/65 R Primary Examiner—J. V. Truhe
Assistant Examiner—D. A. Tone
Attorney, Agent, or Firm—Lyon & Lyon

[57] ABSTRACT

A cable box for electrical non-metallic sheathed cable includes apertures near the corners of the box for cable to pass into the box. Screw activated clamps operable from outside of the box wedge the cables against the walls of the box. Offset detents in the walls of the box and the clamps facilitate securing the cable to the box. The box can be part of a mounting assembly for a recessed light fixture.

8 Claims, 6 Drawing Figures

U.S. Patent
Jul. 10, 1984
4,459,429
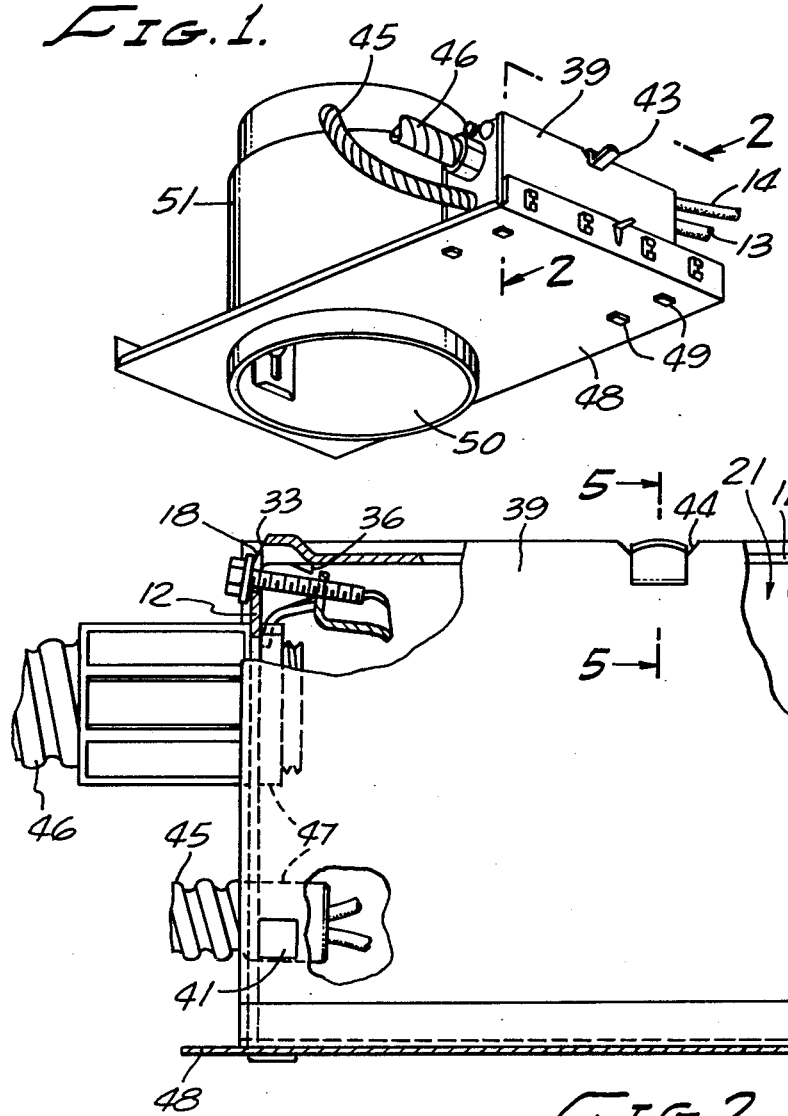
FIG. 1.
FIG. 6.
FIG. 2.
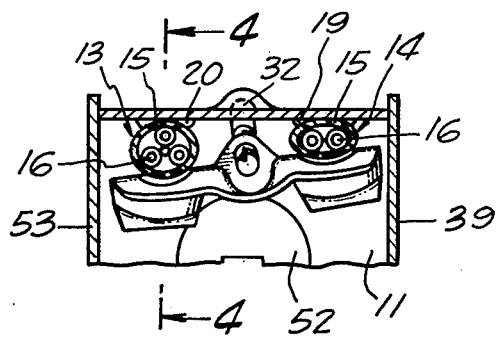
FIG. 3.
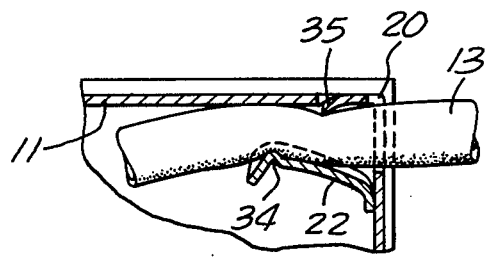
FIG. 4.
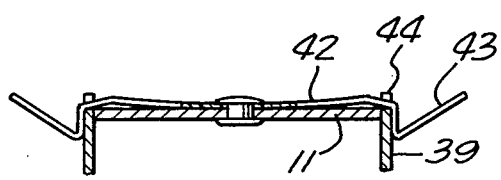
FIG. 5.

CABLE BOX

This is a continuation, of application Ser. No. 164,173, filed June 30, 1980 now abandoned.

BACKGROUND

This invention relates to a cable box. In particular, it relates to a junction box for electrical non-metallic sheathed cable, the box being an individual unit or part of an assembly to mount a light fixture.

Conventional cable boxes have knockouts in the walls of the box so that cable can pass into the cavity of the box for junction or other purposes. So as not to disturb the junction or the cables in the box, for instance, when the cables are moved outside of the box, it is desirable to have a clamping means to secure the cable in a relatively stable manner to the box. One kind of cable where such clamping is particularly desirable is that cable commercially known as "Romex", which is a multiconductor cable.

Many forms of clamping means are known but in the applicant's experience they suffer from one or another disadvantage. In one known junction box, clamping plates are operable against the wall adjacent the apertures through which the cable passes into the box. The corners of this box are bevelled such that effectively the clamp operates against a surface at 45° to each of the adjacent sides of the box. In order to have this clamp work effectively, a substantial portion of the box is removed by these bevelled walls thereby substantially reducing the effective working volume in the box. The clamp is operated by a screw means activated internally, and because the shank of the screw is open to the inside of the box, the danger exists that the tool for turning the screw, and the turning shank itself, can damage the cable within the box. The bevelled effect permits screws to be directed to the open face of the box, thereby facilitating turning the screw. In other cases the screw head is angularly offset relative to the opening, thereby creating difficulties in operation.

It is known to provide detents in the clamping plate and the wall against which the clamping plate moves, so that the cable is pinched into security with the wall. A disadvantage of this is that the cable could be weakened in the efforts made in securely anchoring the cable to the box. Another reason for the bevelled face in this prior art device is that as the screw passes outside of the box during wedging, it will not protrude beyond the back wall of the box.

Another prior art device comprises a rectangular junction box in which apertures are provided in the metal side walls of the box enabling cables to pass into the box. A clamping device is operable from inside the box and includes a screw which passes through the back wall of the box so that the clamping plate is forced downwardly onto the back plate of the cable box. As the screw is tightened it progressively protrudes further beyond the back of the box. This protrusion is dangerous in cases where the box is not mounted within a wall, and, when mounted within a wall, it is a problem where there is a restricted space behind the surface of the wall. This prior art device requires covering legs which move across the apertures in the side walls as the clamping means is drawn against the back wall thereby to cover these apertures from the dangerous ingress of tools and the like into the junction box. Accordingly, more material is needed in this clamping device than is actually required to effect clamping.

In yet another form of the prior art, a threaded tube and nut formation is applied for fitting about a knocked-out aperture in a wall of a cable box. Extending from the threaded tube through which the cable passes is a saddle for receiving cable and which cooperates with a movable arm which may be moved by means of two spaced screws either towards or away from the saddle. A disadvantage of such clamping mechanism is that it must be spaced from the adjacent walls of the box to permit installation and hence the cable entering the cable box must necessarily pass into the center of the box thereby wasting space in the box. The material required for such a clamping mechanism is also a relatively heavy gauge, and installation of the clamping means requires several operations making its use unduly expensive.

There is accordingly a need to provide a cable box which permits the maximum use to be made of the inside housing of the box, while at the same time providing a clamping mechanism strategically located to effect clamping. The necessary clamping mechanism should avoid the risk of damage to the cable being clamped, and at the same time the clamping mechanism should not require insertion of tools or the like into the box. It is also desirable to minimize the number of portions and sharp edges of the clamping mechanism exposed in the box thereby minimizing the danger of damage to the box contents. Furthermore, the clamping mechanism should be easily operable without access to the interior of the box.

SUMMARY OF THE INVENTION

According to the present invention, these objectives are met by the provision of a rectangular cable box having at least one aperture in one of its walls to receive the cable and a clamp means which cooperates with the cable and the box all in a unique manner. The clamp means is positioned at one of the corners of the box and is adapted to wedge the cable against the wall of the housing adjacent that containing the aperture. A hole formed in the wall of the housing adjacent the cable aperture permits passage of the shank of a screw which cooperates with a clamping plate to force the cable against the adjoining wall of the box. The clamping plate and adjoining wall are provided with offset detents to firmly grip the cable and force it into a serpentine path. Because the screw can be turned from outside of the box, clamping and releasing of the cable is easier and less time consuming.

DESCRIPTION OF THE DRAWINGS

FIG. 1 is a perspective view of a cable box for electrical non-metallic sheathed cable mounted as an assembly on a plate with a light fixture, FIG. 2 is a side elevation of the cable box along line 2—2 of FIG. 1 with part of the side closure panel broken away, FIG. 3 is a partial sectional end view of the cable box along line 3—3 of FIG. 2, FIG. 4 is a partial sectional side view of a corner of the cable box along lines 4—4 of FIG. 3, FIG. 5 is a partial sectional end view of the cable box showing the closure mechanism for the box along 5—5 of FIG. 2, and FIG. 6 is a perspective view of the clamp means and screw means operative in the cable box.

DETAILED DESCRIPTION OF THE INVENTION

A cable box for electrical sheathed cable includes walls, 10, 11 and 12 forming a housing for cables 13 and 14 receivable in the box. The cables 13 and 14 in this embodiment of the invention are shown to have different diameters and the cables with which the invention is particularly concerned have a sheath 15 which is of a non-metallic nature such that the cables 13 and 14 are relatively flexible. Inside the cables 13 and 14 there are a plurality of conductors 16. Typically, such cables are known in the trade as "Romex" cables.

The first wall 10 and second wall 11 of the box define a corner 17 which is substantially right angular as the walls 10 and 11 meet at right angles. The second wall 11 and third wall 12 substantially meet at right angles and define a second right angled corner 18 opposite corner 17. As shown, the second wall 11 is the top wall of the cable box. Adjacent the corners 17 and 18 in the walls 10 and 12 respectively, there are provided two apertures 19 and 20 for the cables 13 and 14 respectively to pass into the housing 21 of the cable box. The apertures 19 and 20 in wall 10 and wall 12 can be formed in the cable box on manufacture of the box or alternatively knock out elements removable from the walls can be positioned in the place of the apertures 19 and 20, and the apertures will be formed on removal of these knock out elements. A knock out element 52 is shown in a different position in the wall 10 of the box.

In each of the corners 17 and 18 of the box there is provided a clamp means 22 which includes a plate 23 shaped to receive across its face 24 the cables 13 and 14. For this purpose there are two trough zones 25 and 26 across which the cables 13 and 14 pass respectively. Between the trough zones there is an upstanding lip 27 with a threaded aperture 28.

A screw means 29 cooperates with the clamp 22, the screw having a threaded shank 30 and a tool engaging head 31. This head may conveniently be hexagonal in shape and/or provided with a transverse slot, both of which facilitate operation by tools.

In the wall 10 and the wall 12 there are provided holes 32 and 33 respectively so that the shank 30 of the screw 29 can pass into the housing 21 and secure the clamp means 22 in the housing 21. The holes 32 and 33 respectively are between the apertures 19 and 20 through which the cables 13 and 14 pass into the housing 21, and thus the apertures 19 and 20 straddle the holes 32 and 33. As arranged, the apertures 19, 20 and holes 32 and 33 are located adjacent the top corners 17 and 18 of the box. In location in the box, the head 31 of the screw 29 is positioned outside the walls 10 and 12 respectively.

Across each of the troughs 25 and 26 of the clamp plate 23 there is provided a transverse detent 34 which is punched upwardly from the face 24 of plate 23. Downwardly directed detents 35 and 36 are formed in the wall 11 of the cable box, and, as positioned along the line of the cables 13 and 14, these detents 35 and 36 on the one hand and 34 on the other hand are longitudinally offset relative to each other. Detents 35 and 36 are also transversely formed relative to the longitudinal line of the cables 13 and 14.

Walls 10, 11 and 12 and a base wall 37, the fourth wall, define between them a cavity 38 in the side of the cable box. A closure means for the cavity 38 is a side panel 39 which matingly engages the walls 10, 11, 12 and 37 of the housing 21. Projections 40 and 41 from the side panel 39 ensure correct location of the side panel 39 over the cavity 38. On wall 11 there is mounted a leaf spring 42 with a protrusion 43. A recess 44 in the side panel 39 receives the leaf spring 42 such that the recess projects beyond the side panel 39 and clips the side panel 39 to the walls of the housing. A similar side panel 53 is attached in the same manner to the other side of the box to completely enclose the cavity 38.

Other apertures for flexible cables 45 and 46 can be provided in the walls to the housing of the box and clamp means 47 or the like may be used to secure the cables 45 and 46 through apertures formed by removal of knock out elements or the like to the box.

The cable box is mounted on a plate 48 by affixing the fourth wall 37 on the plate 48 by means of suitable anchorage clips 49. Plate 48 provides a port 50 spaced from the box and within the port there is mounted a lighting fixture 51. Cable 45 from the cable box 45 is shown connecting the light fixture 51 with the box.

In use, cables 13 and 14 are fed into the housing 21 of the box through apertures 19 and 20. The clamp means 22 is in a released position removed from the wall 10 thereby permitting feeding of the cables 13 and 14 into the housing 21. In such released position, the shank 30 of screw 29 engages at its extremity the threaded aperture 28 and the clamp is thus relatively freely located below the corner 17 of the box. Securing the cable to the box is effected by a wedging action achieved as the screw 29 is operated from outside of the box and the clamp plate 23 is moved towards the walls 10 and 11 and the corner 17.

As the clamp plate is drawn upwardly the detents 34 and 35 press into the sheath of the cable to secure effectively the cable in relation to the box. A serpentine action is caused by the detents as a result of their longitudinal displacement relative to the cables 13 and 14. The action of drawing the clamp plate 23 towards the corner 17 moves the detents relative to each other simultaneously in both a vertical and horizontal direction as illustrated and thus the serpentine securing action is effected simultaneously in both directions thus providing an efficient securement of the cables 13 and 14 relative to the box without endangering the integrity of the cables. This tightening serpentine action is contrary to a pinching action which would occur if the two detents were opposite each other, and which action can be deleterious.

Operation of the screw 29 from outside the walls 10, 11 and 12 of the box makes clamping and releasing of the cables easier and avoids the necessity of using tools inside the box which might damage the cables 13 and 14 or the sheaths 15 or the conductors 16 themselves. Likewise, the conductors from cables 45 and 46 are also spaced any danger of damage because of the external operation on the clamping screw 29. Further, by locating the clamping means 22 in the upper corners of the box, as the shank 30 protrudes beyond the lip 27 of the clamp plate, there is no danger of the turning shank 30 fouling the cables in the box. By having the lip 27 formed on the plate 24 on the side adjacent the corner 17, the plate 24 itself provides a shielding protection to the interior of the housing 21.

As clamping is effected there is no protrusion of the clamp means 22 or the screw 29 beyond the perimeter of the walls 10, 11 and 12, other than the location of the head 31 abutting the outside of the walls. The box thus occupies a substantially regular rectangular space as defined by the walls 10, 11 and 12 and 37, and thus provision does not have to be made for further projections from the rectangular format. This increases safety since there is no bare shank protruding to cut or tear an installer's hands.

By having cable clamped adjacent the top plate 11 of the cable box, it is possible to have cable pass in and out of the box through the apertures in walls 10 and 12 and to retain the cable, if desired, adjacent the wall 11 so that the working area in the housing is optimized.

Clearly, although the drawings illustrate cables 13 and 14 entering only through apertures 19 and 20 in wall 10, the same arrangement of cables can enter apertures through wall 12 and be clamped against walls 11 and 12 and corner 18 in the same fashion as described and illustrated above with regard to walls 10, 11 and corner 17.

The foregoing detailed description is to be clearly understood as given by way of illustration and example only, the spirit and scope of this invention being limited solely by the appended claims.

I claim:

1. A cable box for electrical cable, wherein the box comprises:
   (a) walls forming a housing;
   (b) at least one means in a first wall of the housing for forming an aperture to enable cable to pass into the housing;
   (c) a clamp means to receive cable passing into the housing through the aperture, the clamp means being adapted for wedging the cable against a second wall of the housing;
   (d) screw means cooperative with the clamp means, the screw means including a shank;
   (e) an hole in the first wall of the housing for passage of the shank of the screw means into the housing;
   (f) means on the screw shank and operative with the shank to effect movement of the clamp means from or towards the second wall, said means being operable from outside the walls of the housing; and
   (g) wherein a corner is formed between said first and second walls, such walls meeting substantially at right angles thereby to form the corner substantially at right angles, and wherein the aperture is located in said first wall substantially adjacent the right angular corner, and the clamp means is adapted to move pivotably about said apertured wall while moving towards or from said second wall thereby to wedge the cable against said second wall.

2. The cable box according to claim 1, wherein said clamp means comprises a plate having a trough to receive said cable, and an upstanding lip having a threaded aperture to receive said shank.

3. The cable box according to claim 2, wherein said plate has two troughs for receiving two cables, and wherein said upstanding lip is located between the troughs on the side of the plate toward the first wall of the housing.

4. A cable box according to claim 1, wherein the wall against which the cable sheath is adapted to be wedged includes detent means for engaging the cable sheath, the detent means being adapted to be offset relative to the detent means of the clamp means such that as the clamp means is moved towards said second wall there is provided a serpentine path for cable adapted to be wedged against said second wall.

5. The cable box according to any one of claims 1 to 4 wherein the clamp means provides a troughed surface for the shank, such surface being adapted to move in a direction substantially parallel to the screw shank, whereby such surface provides a shielding protection of the cables from the shank.

6. The cable box according to claim 1 wherein the clamp means provides a shielding protection to the interior of the housing.

7. An assembly of a cable box for electrical cable and a light fixture, comprising:
   (a) walls for the cable box forming a substantially rectangular housing;
   (b) an opening for the housing to provide access to the housing;
   (c) a closure means for the opening;
   (d) at least one means in a first wall of the housing for forming an aperture to enable said cable to pass into the housing, said aperture being located substantially adjacent a second wall of the housing, such second wall being adapted to be the upper wall of the housing;
   (e) clamp means to receive cable passing into the housing through said aperture, the clamp means being adapted to be movable towards or from the second wall and being adapted to wedge cable against the second wall of the housing;
   (f) screw means cooperative with said clamp means, the screw means including a shank;
   (g) a hole in the first wall of the housing for passage of the shank of the screw means;
   (h) means on the screw shank and operative with the shank to effect movement of the clamp means from or towards the first and the second walls, respectively, and when in abutment with such first wall to be pivotably movable thereon while moving towards or from said second wall, said means being operable from outside the walls of the housing;
   (i) plate means for mounting the box, such plate means being affixed to the box;
   (j) a port in the plate means spaced from the box for receiving a light fixture;
   (k) a light fixture mounted in the port; and
   (l) the clamp means provides a plate having a troughed surface for the shank, such surface being adapted to move in a direction substantially parallel to the screw shank, whereby such surface provides a shielding protection of the cables from the shank.

8. An assembly according to claim 7, wherein the clamp means provides a shielding protection to the interior of the housing.

* * * * *